Nov. 8, 1938.   A. GULLO   2,135,749
SHOCK ABSORBER
Filed Jan. 28, 1937   2 Sheets-Sheet 1

Inventor
Anthony Gullo
By Clarence A. O'Brien
Hyman Berman
Attorneys

Nov. 8, 1938.    A. GULLO    2,135,749

SHOCK ABSORBER

Filed Jan. 28, 1937    2 Sheets-Sheet 2

Inventor
Anthony Gullo

By Clarence A. O'Brien
Hyman Berman
Attorneys

Patented Nov. 8, 1938

2,135,749

UNITED STATES PATENT OFFICE 2,135,749

SHOCK ABSORBER

Anthony Gullo, San Jose, Calif.

Application January 28, 1937, Serial No. 122,857

6 Claims. (Cl. 267—1)

My invention relates generally to shock absorbing means utilizable to mitigate, lessen, and harmlessly absorb the impact of a moving vehicle, boat or airplane, upon coming into violent contact with any obstacle, and particularly to a shock absorber of this type which consists essentially of two or more tapering or conical cylinders made of suitable material, and wherein the small end of one cylinder is telescoped into the large end of another cylinder, the walls of the cylinders being formed with one or more weakening grooves on the side thereof to provide weakened areas designed to split only under certain amounts of pressure exerted on the outer ends of the cylinders, and upon telescoping of the cylinders into each other, as the shock is transmitted thereto, and an important object of my invention is to provide simple, effective and practical arrangements of this character which have great shock absorbing characteristics, so that shocks to vehicles ordinarily resulting in damage thereto, will be sufficiently dissipated to prevent injury to the vehicle and/or its occupants.

Another important object of my invention is to provide in a shock absorbing device of the character indicated, an arrangement of shock absorbing cylinders of tapering or conical form in telescoped relation, wherein the cylinders are arranged in sequences according to size and diameter and strength of the cylinder walls, so that corresponding sequences of cylinders will go into operation for shock absorbing purposes, according to the degree and duration of the shock imposed on the shock absorber, the arrangement being such that the corresponding cylinders split alternately.

Another important object of my invention is to provide a shock absorber of the character indicated above in which the smaller cylinders begin splitting at one end of the sequence, and the next in size at the opposite end thereof, and so on through the entire sequence of cylinders, until the shock has been completely absorbed.

Other important objects of my invention will be apparent from a reading of the following description taken in connection with the drawings, wherein for purposes of illustration I have shown a preferred embodiment of my invention.

In the drawings:—

Figure 1:
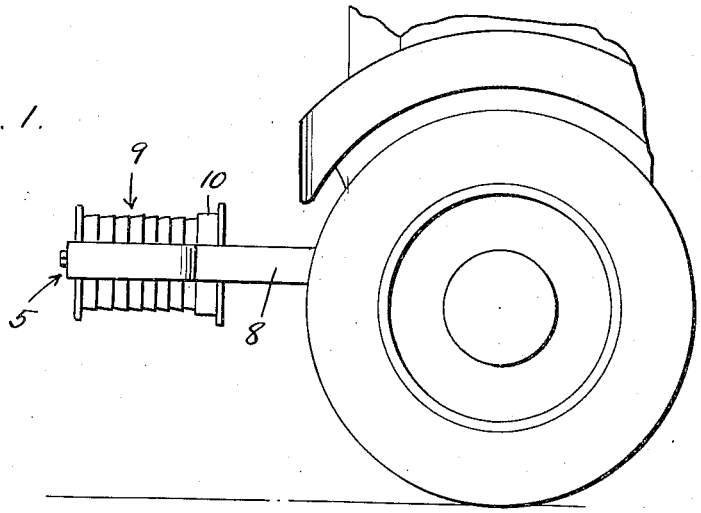
Figure 1 is a general side elevational view of the front part of a motor vehicle showing a shock absorber in accordance with the present invention mounted thereon in conjunction with a front bumper.
Figure 2:
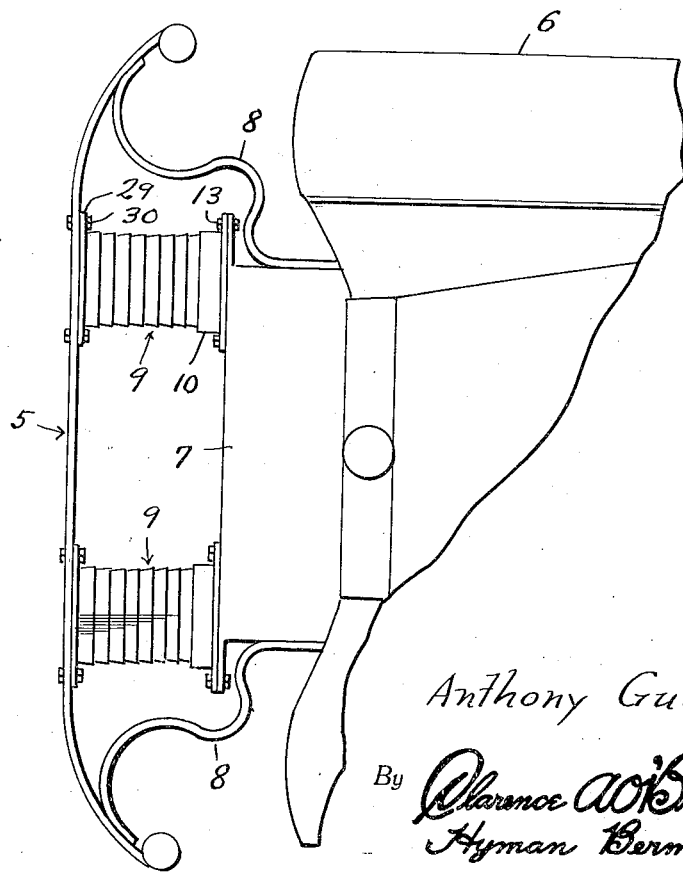
Figure 2 is a top plan view of Figure 1.

Referring in detail to the drawings, the numeral 5 generally designates a conventional form of front or rear bumper for a vehicle 6, the said vehicle having a forepart 7 to which the bumper is attached by means of brackets 8 which are intended to be conventional in form and arrangement. In accordance with the present invention I mount one, two or more of the shock absorbers each of which is generally designated 9 on the front of the forepart 7 of the vehicle and in operative relation to the bumper 5. In certain instances it may be desirable to entirely eliminate the bumper 5 and to make the shock absorbers 9 act directly against the colliding object, and this may be done in accordance with the present invention.

Figure 3:
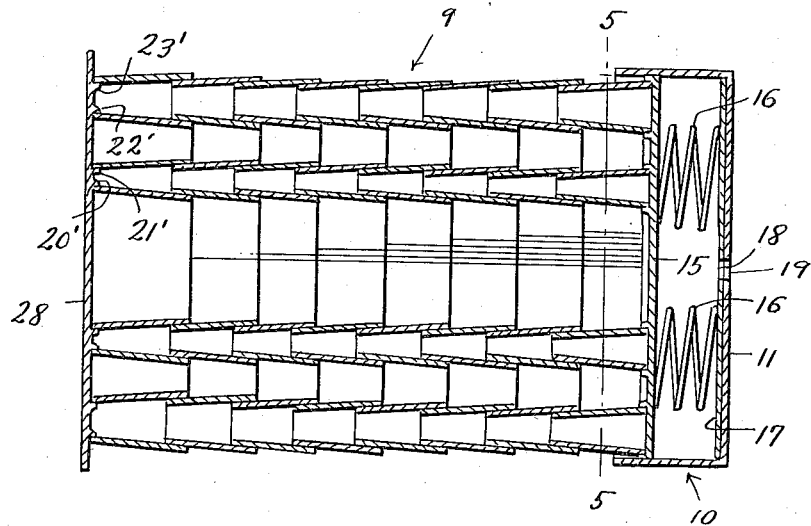
Figure 3 is a longitudinal sectional view taken through one of the shock absorbers shown in Figures 1 and 2.

Each of the shock absorber units 9 is composed of a base 10 which consists of a disk 11 having attaching ears 12 thereon for mounting by means of bolts 13 onto the forepart 7 of the vehicle, the said disk having a flange 14 adjacent its edge and providing a cylinder in which the diaphragm 15 works as shown in Figure 3, the said diaphragm being normally kept in an outward position by helical springs 16. A washer 17 may underlie the spring 16 at the right hand end as indicated in Figure 3. Openings 18 and 19 in the washers 17 and in the disk 11, respectively, are provided to permit adequate escape of air as the shock absorber is collapsed.

Figures 4, 5:
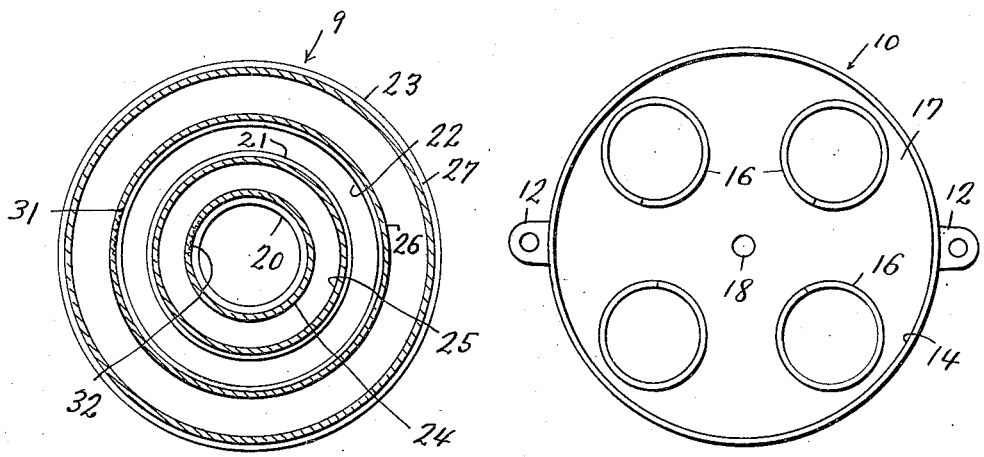
Figure 4 is a front view of one of the shock absorber bases.
Figure 5 is a transverse vertical sectional view taken through Figure 3 approximately on the line 5—5.

The diaphragm 15 is provided on its left hand face with flanges 20, 21, 22, and 23, or in greater or in less numbers, the said flanges being concentrically spaced, and acting as retainers for the respective tapering cylinders 24, 25, 26, and 27. That is to say, the large ends of the cylinders of each series or sequence or cylinders are arranged within and without the flanges 20, 21, 22 and 23 as indicated in Figures 3 and 5 of the drawings, while the extreme left hand cylinder or end cylinder in the next sequences of cylinders, that is the small ends of these cylinders are arranged at the outer sides rather than against the inner sides of corresponding flanges 23', 22', 21' and 20' of the retainer or front plate 28. This front plate is provided with attaching ears 29 to accommodate bolts 30 which secure the same to the bumper 5. Where the bumper 5 is absent, suitable connection means between the attaching ears of the base 10 and the attaching ears of the plate 28 may be provided without invention.

As indicated in Figure 5 of the drawings, the tapered cylinder 26 may be provided in one side with longitudinal indentations 31 which are gauged so as to permit the cylinder to split as the next cylinder which is inserted in its large end is sequentially telescoped thereinto, during the transmission of the shock from the direction of the plate 28. Similar weakening lines or grooves 32 are shown as provided in the cylinder 24 for identical purposes. These weakened areas may be distributed at the discretion of the manufacturer in all or only a certain number of the cylinders, and in such degree as will procure the desired shock absorbing characteristics of the shock absorber.

In the embodiment of the invention shown it is obvious that upon the impact of the shock on the plate 28 or actually on the bumper bar 5, the smaller or inner cylinders will exhibit a splitting action, and that the larger cylinders also begin to collapse, so that there is gradual and sequential absorption of the shock, during the progress of which certain of the cylinders will split along the weakened areas and thereby transfer the burden of taking up the shock to other cylinders not as yet split; until by the sequential action of the various cylinders in cooperation, the shock will finally be absorbed without being transmitted directly to the vehicle.

The springs 16 are sufficiently strong to hold the shock absorbing elements in place and at the same time permit a certain play in the shock absorber as a whole to permit absorbing minor bumps imparted to the bumper 5 without impairing the alignment of the various cylinders. The shock absorbers themselves begin to function only when a major collision occurs. The cylinders are so arranged as to begin splitting alternately, that is, the smallest cylinders begin splitting at one end of the sequence, and the next in size at the opposite end.

If desired, the cylinders could be arranged to start splitting all from one end, or the two largest in size from one end, and the smaller in size from the opposite end, or vice versa. When this latter arrangement is used the center cylinders must be furnished with a keen edge or beveled edge so as to not interfere with each other in the course of splitting and telescoping into each other.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. A shock absorber of the character described comprising a series of groups of tapered cylinders, the cylinders of each group being substantially concentrically spaced from each other and oppositely tapered, the smaller ends of some of the cylinders being partially telescoped into the larger ends of some of the cylinders of the adjacent groups, some of said cylinders having longitudinal weakened areas permitting them to split therealong and expand under pressure exerted axially with respect to the groups of cylinders.

2. A shock absorber of the character described comprising a series of groups of concentrically spaced tapered cylinders, adjacent cylinders in each group being oppositely tapered, the smaller ends of some of the cylinders of the said groups being partially telescoped into the larger ends of some of the cylinders of the adjacent groups, a mounting plate at the outer end of one of said groups, annuli on said plate internally seating in the smaller ends of the cylinders of said one group and holding these cylinders and the group in alignment, an inner plate similarly operatively engaging the larger end of another of said groups, and having annuli externally seating in the said larger end and means for mounting the last-mentioned plate in position on a vehicle or the like, said means comprising a housing in which the last-mentioned plate slides, and a plurality of circumferentially distributed helical springs acting between the last-mentioned plate and said housing for absorbing minor shocks failing to cause collapsing of the shock absorber as a whole.

3. A shock absorber of the character described comprising a series of groups of concentrically spaced tapered cylinders, adjacent cylinders in each group being oppositely tapered, the smaller ends of some of the cylinders of the said groups being partially telescoped into the larger ends of some of the cylinders of the adjacent groups, a mounting plate at the outer end of one of said groups, annuli on said plate seating the smaller ends of the cylinders of said one group and holding these cylinders and the group in alignment, an inner plate similarly operatively engaging the wider end of another of said groups, and means for mounting the last-mentioned plate in position on a vehicle or the like, said means comprising a housing in which the last-mentioned plate slides, a plurality of circumferentially distributed helical springs within said housing and acting between said housing and the last-mentioned plate for absorbing minor shocks failing to cause collapsing of the shock absorber as a whole, in combination with a vehicle having a forepart, to which said housing is mounted, and a bumper bar extending spacedly across said forepart and attached to the first-mentioned plate, whereby shock imposed on the bumper bar is transmitted to the shock absorber as a whole.

4. A shock absorber comprising a substantially cylindrical form composed of several longitudinally arranged groups of concentrically spaced tapered cylinders, each group consisting of at least four of such tapered cylinders, adjacent ones of said tapered cylinders being oppositely tapered, the two outer adjacent cylinders resulting in an outer annular form having a smaller open end and a larger open end, the two inner adjacent cylinders resulting in an inner annular form having a smaller open end and a larger open end, the said smaller and larger open ends facing in opposite axial directions, with the smaller ends of one group telescoped partially into the larger ends of the next adjacent group.

5. A shock absorber comprising a substantially cylindrical form composed of several longitudinally arranged groups of concentrically spaced tapered cylinders, each group consisting of at least four of such tapered cylinders, adjacent ones of said tapered cylinders being oppositely tapered, the two outer adjacent cylinders resulting in an outer annular form having a smaller open end and a larger open end, the two inner adjacent cylinders resulting in an inner annular form having a smaller open end and a larger open end, the said smaller and larger open ends facing in opposite axial directions, with the smaller ends of one group telescoped partially into the larger ends of the next adjacent group, an end plate having a pair of ribs for internally seating in the said smaller open ends of the annuli at one end of said cylindrical form, and a second end plate formed with a pair of annular ribs for internally seating the larger end of each of the annuli of a group at the opposite end of the cylindrical form.

6. A shock absorber comprising a substantially cylindrical form composed of several longitudinally arranged groups of concentrically spaced tapered cylinders, each group consisting of at least four of such tapered cylinders, adjacent ones of said tapered cylinders being oppositely tapered, the two outer adjacent cylinders resulting in an outer annular form having a smaller open end and a larger open end, the two inner adjacent cylinders resulting in an inner annular form having a smaller open end and a larger open end, the said smaller and larger open ends facing in opposite axial directions, with the smaller ends of one group telescoped partially into the larger ends of the next adjacent group, an end plate having a pair of ribs for internally seating in the said smaller open ends of the annuli at one end of said cylindrical form, and a second end plate formed with a pair of annular ribs for internally seating the larger end of each of the annuli of a group at the opposite end of the cylindrical form, some of said cylinders being longitudinally slit to spread when sufficient pressure is applied axially to said cylindrical form.

ANTHONY GULLO.